US 8,141,479 B2

(12) United States Patent
Ellersiek et al.

(10) Patent No.: US 8,141,479 B2
(45) Date of Patent: Mar. 27, 2012

(54) COOKING DEVICE FOR ARRANGEMENT ON A HORIZONTAL WORK SURFACE

(75) Inventors: Ralf Ellersiek, Buende (DE); Andreas Gapp, Ellboegen (AT); Uwe Hahn, Guetersloh (DE); Marco Stuettem, Oelde (DE); Markus Zorn, Schoenberg (AT)

(73) Assignee: Miele & Cie. KG, Guetersloh (DE)

( * ) Notice: Subject to any disclaimer, the term of this patent is extended or adjusted under 35 U.S.C. 154(b) by 897 days.

(21) Appl. No.: 12/188,620

(22) Filed: Aug. 8, 2008

(65) Prior Publication Data

US 2009/0038482 A1 Feb. 12, 2009

(30) Foreign Application Priority Data

Aug. 10, 2007 (DE) .......................... 10 2007 038 040

(51) Int. Cl.
*A47J 37/00* (2006.01)
*F24C 15/30* (2006.01)
(52) U.S. Cl. .......................................... 99/449; 99/340
(58) Field of Classification Search .................... 99/338, 99/340, 385, 390, 391, 443, 444, 449, 450; 126/14, 41, 299 R; 219/388, 455.12, 521; 392/418
See application file for complete search history.

(56) References Cited

U.S. PATENT DOCUMENTS

| | | | | | |
|---|---|---|---|---|---|
| 2,198,645 | A | * | 4/1940 | Wolcott | 99/338 |
| 2,255,466 | A | * | 9/1941 | Jenkins | 219/521 |
| 2,681,404 | A | * | 6/1954 | Hofer | 219/525 |
| 3,263,594 | A | * | 8/1966 | Appleman | 99/340 |
| 3,267,925 | A | * | 8/1966 | Oatley | 126/41 R |
| 3,610,885 | A | * | 10/1971 | Zingg | 219/451.1 |
| 4,062,275 | A | * | 12/1977 | Appel et al. | 99/393 |
| 4,230,066 | A | * | 10/1980 | Lents | 118/20 |
| 4,577,092 | A | * | 3/1986 | Lenoir | 392/418 |
| 5,000,083 | A | * | 3/1991 | Pickave | 99/327 |
| 5,467,695 | A | * | 11/1995 | Keller et al. | 99/422 |
| 5,611,264 | A | * | 3/1997 | Studer | 99/340 |
| RE36,147 | E | * | 3/1999 | Backus et al. | 425/209 |
| 5,928,544 | A | * | 7/1999 | Bennett | 219/478 |
| 7,913,615 | B2 | * | 3/2011 | Calzada et al. | 99/342 |
| 2006/0254430 | A1 | * | 11/2006 | Nevarez et al. | 99/349 |

FOREIGN PATENT DOCUMENTS

DE 2227622 2/1973
(Continued)

OTHER PUBLICATIONS

European Search Report for Application No. EP 08 01 2189, dated Apr. 17, 2009.

*Primary Examiner* — Mark Graham
(74) *Attorney, Agent, or Firm* — Leydig, Voit & Mayer, Ltd.

(57) ABSTRACT

A cooking device disposable on a horizontal surface. The cooking device includes a support mechanism that is movable by a drive, in a direction substantially vertical to the surface, between an operating position and an inactive position. The cooking device also has a heating unit disposed on the support mechanism and a food tray disposed on the support mechanism. The food tray and heating unit are held on the support mechanism such that the food tray and heating unit are movable relative to one another. In an inactive position of the support mechanism, the food tray has a height position that is lower than a height position of the surface.

16 Claims, 7 Drawing Sheets

FOREIGN PATENT DOCUMENTS

| | | |
|---|---|---|
| DE | 2657746 | 6/1978 |
| DE | 2916823 A1 | 11/1980 |
| DE | 29610240 | 8/1996 |
| DE | 10354127 | 6/2005 |
| DE | 202006012631 | 10/2006 |
| EP | 1532908 | 5/2005 |
| GB | 1347885 | 2/1974 |

* cited by examiner

COOKING DEVICE FOR ARRANGEMENT ON A HORIZONTAL WORK SURFACE

CROSS REFERENCE TO RELATED APPLICATIONS

Priority is claimed to German patent application DE 10 2007 038 040.4, filed Aug. 10, 2007, which is hereby incorporated by reference herein.

FIELD

The invention relates to a cooking device for arrangement on an essentially horizontal work surface.

BACKGROUND

German utility model DE 296 10 240 U1 describes a cooking device known in the technical world as a "salamander" for food that serves to brown, caramelize, grill, toast, broil, heat and keep it warm, etc.

As a refinement of the salamander described, for example, in German utility model DE 296 10 240 U1, German patent application DE 103 54 127 A1 describes a special positioning of the heating device on the support mechanism. The height of the heating device on the support mechanism can be adjusted whereas the tray is attached thereto in a fixed position, so that the vertical distance between the tray for the food and the heating device can be set as desired.

Moreover, German patent application DE 26 57 746 A1 shows a cooking device configured as an oven for arrangement on an essentially horizontal work surface, comprising a support mechanism configured as an oven chamber, on which several trays configured as metal insert racks for food and a heating unit formed by the ceiling of the oven chamber and by a broiling element are arranged. The support mechanism can be moved by means of a manual or automatic drive essentially vertically to the work surface, back and forth between an inactive position and an operating position, whereby, in the operating position, at least the tray is at a lower height position than the top of the work surface.

SUMMARY

An aspect of the present invention is to provide a cooking device that requires a small amount of storage space when it is not in use, in other words, when it is in the inactive position.

In an embodiment, the present invention provides a cooking device disposable on a horizontal surface. The cooking device includes a support mechanism that is movable by a drive, in a direction substantially vertical to the surface, between an operating position and an inactive position. The cooking device also has a heating unit disposed on the support mechanism and a food tray disposed on the support mechanism. The food tray and heating unit are held on the support mechanism such that the food tray and heating unit are movable relative to one another. In an inactive position of the support mechanism, the food tray has a height position that is lower than a height position of the surface.

BRIEF DESCRIPTION OF THE DRAWINGS

An embodiment of the invention is explained in detail below and depicted schematically in the drawings, in which.

DETAILED DESCRIPTION

Figure 1:
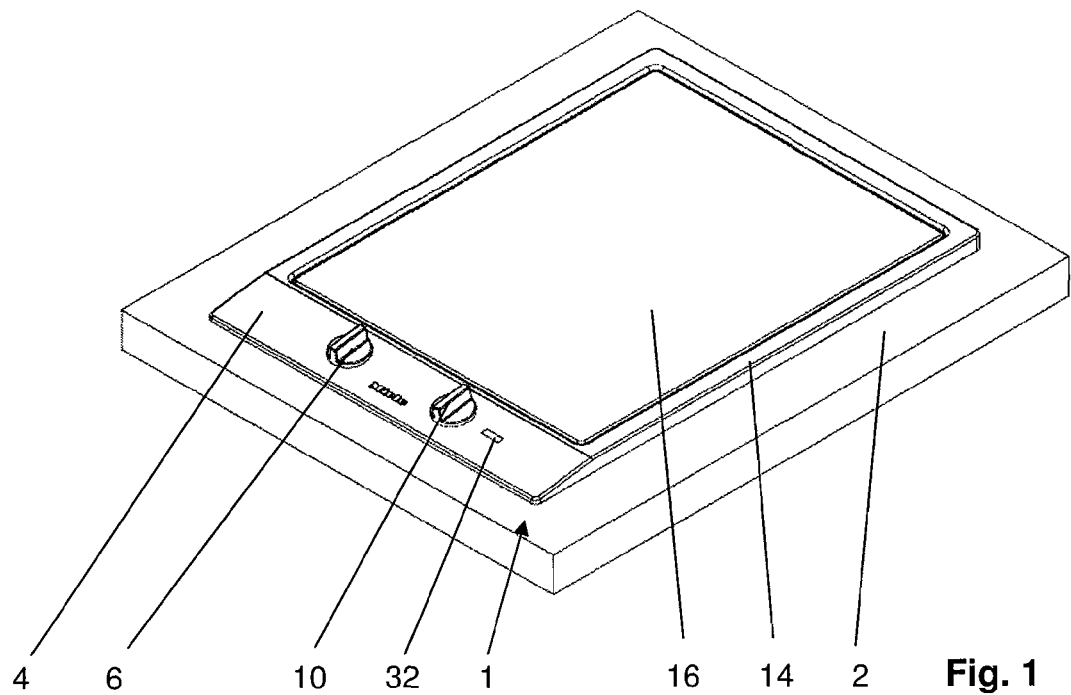
FIG. 1 is a perspective top view of a cooking device according to the invention, with the support mechanism in the inactive position.

In addition to the small storage space when the device is not in use, the present invention provides the possibility of a cooking device that may be is kept out of sight of the user to the greatest extent possible when it is in its inactive position. This may improve the overall esthetic appearance of the area where the cooking device is set up. The cooking device can be configured in such a manner that it blends in with the rest of the kitchen or the like inconspicuously, at least when the support mechanism is in the inactive position. In particular, this may be achieved if there are cabinets underneath the work surface in which the cooking device is installed and into which it can be retracted when it is in the inactive position. As an alternative to cabinets underneath the work surface, it is likewise conceivable to use other types of enclosures for other built-in appliances, especially built-in kitchen appliances. This further takes advantage of the utilization of the available space. Alternatively, however, it would also be possible for the cooking device to have its own free-standing housing, so that it is not used in combination with a kitchen countertop or with kitchen built-in appliances or other types of enclosures.

In an embodiment of the present invention the tray or the heating unit may be attached vertically to the support mechanism in a fixed position. As a result, the cooking device according to the invention is realized with a particularly simple construction.

It is also possible for the tray and the heating unit to be moved separately from each other, for instance, by two independent electric motors. The tray and the heating unit may be detachably connected via a coupling and as a function of the height position of the support mechanism. This makes it possible to employ a single drive for the tray as well as for the heating unit.

In an embodiment the coupling has a latch that is pretensioned in the direction of the unlatching position by a spring element. As a result, the coupling has a simple and sturdy construction.

The relative position of the tray and of the heating unit in the inactive position, in the operating position and in the intermediate positions can be selected freely within a broad suitable range. In one embodiment the tray and the heating unit can lie against each other when the support mechanism is in the inactive position. This reduces the storage space requirement in the inactive position to a minimum, so that the space gained in this manner can be utilized for other functions or by other devices such as, for instance, other kitchen appliances.

In one embodiment, the height position of the support mechanism can be detected by at least one position sensor and, as a function of the measuring signals, the heater of the heating unit can be switched by an electric control unit of the cooking device. As a result, the heater can be switched on automatically, for example, when the support mechanism is moved into the operating position, and the heater can be switched off automatically, for instance, when the support mechanism is moved into the inactive position. Consequently, the actuation of operating elements such as, for instance, an ON-OFF button, is no longer absolutely necessary.

The drive can be freely selected over a wide suitable range in terms of its type, power and arrangement. The drive can optionally be configured as an electric drive that can be switched on by an operating element. This improves the convenience, for example, in comparison to a drive that is operated manually.

In an embodiment the temperature of the heating unit can be detected by a temperature sensor and, as a function of the measuring signals, the drive of the support mechanism can be switched by the electric control unit of the cooking device. This ensures, for example, that the cooking device cannot be completely lowered into a built-in cabinet in an undesired manner if the temperature of the heater and thus of the heating unit is still above a pre-specified maximum value. This markedly improves the safety of the cooking device.

In another embodiment the tray has a substructure and a cover plate that can be laid onto it, whereby the current path leading to the drive and to the heater is interrupted if the cover plate has not been put in place, even if the operating element is in the switched-on position. This ensures that the cooking device cannot go into operation without the cover plate onto which the food is to be placed.

In another embodiment, the switched-on drive can be automatically switched off as a function of the rise in current. In this manner, simple design and circuit-engineering means can effectuate, for instance, a so-called auto-reverse feature or an overload protection.

FIG. 1 shows a cooking device 1 according to the present invention in its installed position in a work surface 2 configured as a kitchen countertop. The cooking device 1 has an operating panel 4 with an operating element 6 configured as an operating knob that serves to switch on and off the drive 8 that is shown in greater detail in the other figures. The drive 8 is configured here as an electric drive with an electric motor. The other operating element 10 configured as an operating knob serves to set the heating power of the heater 12 that is likewise shown in greater detail in the other figures. The operating panel 4 is part of a surrounding frame 14 of the cooking device 1 in whose center the top of the heating unit 16 can be seen. As can be gleaned from FIG. 1, the top of the cooking device 1 and the top of the work surface 2 are almost flush with each other; all that remains is a small surrounding rim of the kind known, for example, from autonomous kitchen cooktops. The support mechanism 18 shown in greater detail in the other figures is in the inactive position.

Figure 2:
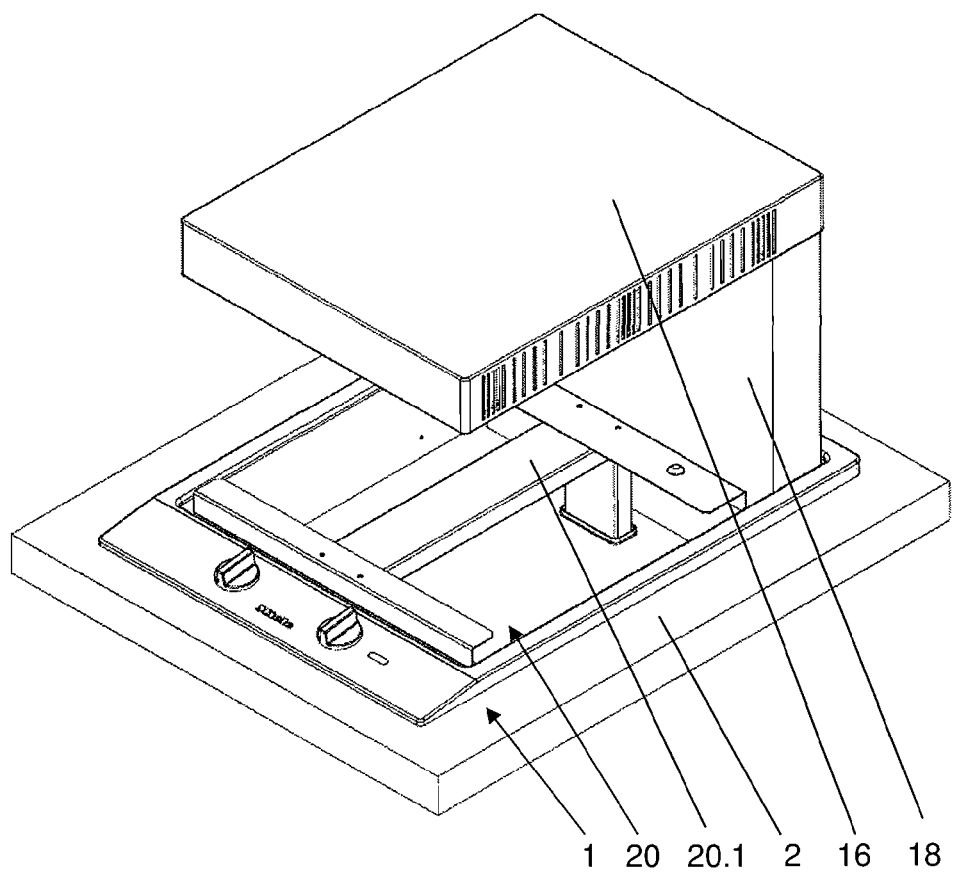
FIG. 2 shows the cooking device of FIG. 1 in a similar depiction and with the support mechanism in an operating position.

When the user actuates the operating knob 6 by turning it clockwise, the support mechanism 18 travels from its inactive position shown in FIG. 1 to an operating position as shown, for example, in FIG. 2. The movement of the support mechanism 18 here is triggered exclusively by turning the operating knob 6 clockwise one time and it continues, even without any further actuation of the operating knob 6, until the maximum height position of the support mechanism 18 has been reached. Details about this will be explained on the basis of the other figures. When the operating knob 6 is turned counterclockwise during the movement into one of the operating positions, the drive 8 is switched off and the support mechanism 18 remains in the height position it had reached at that point in time.

A tray 20 for food has a substructure 20.1 shown in FIG. 2 and a cover plate 20.2, which is shown as removed in FIG. 2, onto which the food is to be placed. In contrast to what is shown in FIG. 2, movement of the support mechanism 18 may only possible at all if the cover plate 20.2 has been placed onto the substructure 20.1. This is ensured by a solenoid switch 22 which is shown in greater detail in FIGS. 4 to 7 and which is integrated into an electric control unit 24 of the cooking device 1 symbolically depicted in FIG. 4, whose mode of operation is generally known. Here, if the cover plate 20.2 has not been put in place, the solenoid switch 22 prevents, on the one hand, the drive 8 for the support mechanism 18 from being switched on, irrespective of whether the operating knob 6 has been actuated or not. On the other hand, if the cover plate 20.2 has not been put in place, said solenoid switch 22 prevents the heater 12 from being switched on by means of the operating knob 10 in the familiar manner.

As an extra safety feature, it is provided here in the circuit of the electric control unit 24 that, even after the cover plate 20.2 has been put in place, the heater 12 can only be switched on after the support mechanism 18 has been moved into the inactive position, and subsequently moved into an operating position. In the present embodiment, this also applies in the case of a power outage; in this eventuality as well, even after the power supply has been restored and even if the power is set to ON, the heater 12 is only switched on after the support mechanism 18 has once again been moved into the inactive position, and subsequently moved into an operating position.

Another safety function of the present embodiment consists of the fact that the operating knob 6 has to be continuously actuated in order for the support mechanism 18 to be moved into the inactive position; the user has to turn the operating knob 6 counterclockwise and has to hold it in this position against an autonomous restoring force, for instance, a spring or the like, so that the drive 8 continues to receive current. Such a function is also referred to as a dead man's switch.

In order to increase the convenience for users, the heater 12 is automatically switched on here when the support mechanism 18 is moved into an operating position, provided that a heating power setting has been selected by means of the operating knob 10.

As can be clearly seen in FIG. 2, the heating device 16 in the present embodiment is attached to the support mechanism 18 in a fixed position, so that the heating device 16 is attached vertically to the support mechanism 18 in a fixed position.

Figure 3:
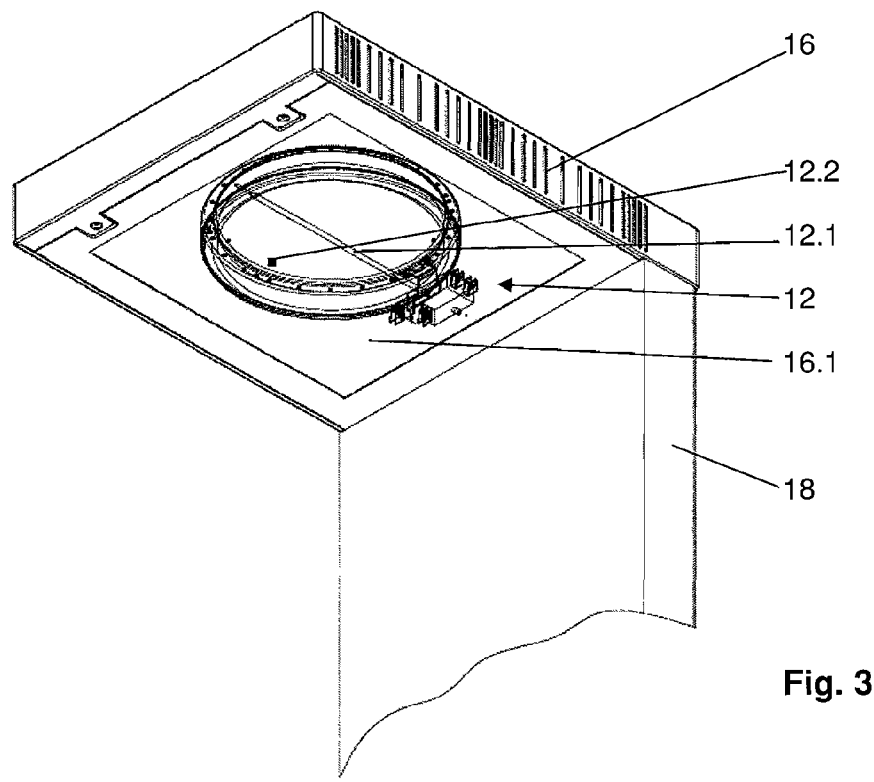
FIG. 3 is a partial bottom view of the cooking device of FIG. 2, in the viewing direction of the heating unit.

FIG. 3 shows the heating device 16 in a bottom view in the viewing direction of the heater 12. The heater 12 is configured here as an electric radiant heater. Fundamentally, however, other types of heaters such as, for instance, gas or halogen lamps, are likewise conceivable. For purposes of allowing better cleaning and as protection against accidental contact, the bottom of the heater 12 is covered by a cover 16.1, for example, glass or ceramic, that is permeable to heat radiation.

FIGS. 4 to 7 show sectional side views of the cooking device 1 installed into the work surface 2, so that the support mechanism 18 and the associated lifting mechanism are visible.

Figure 4:
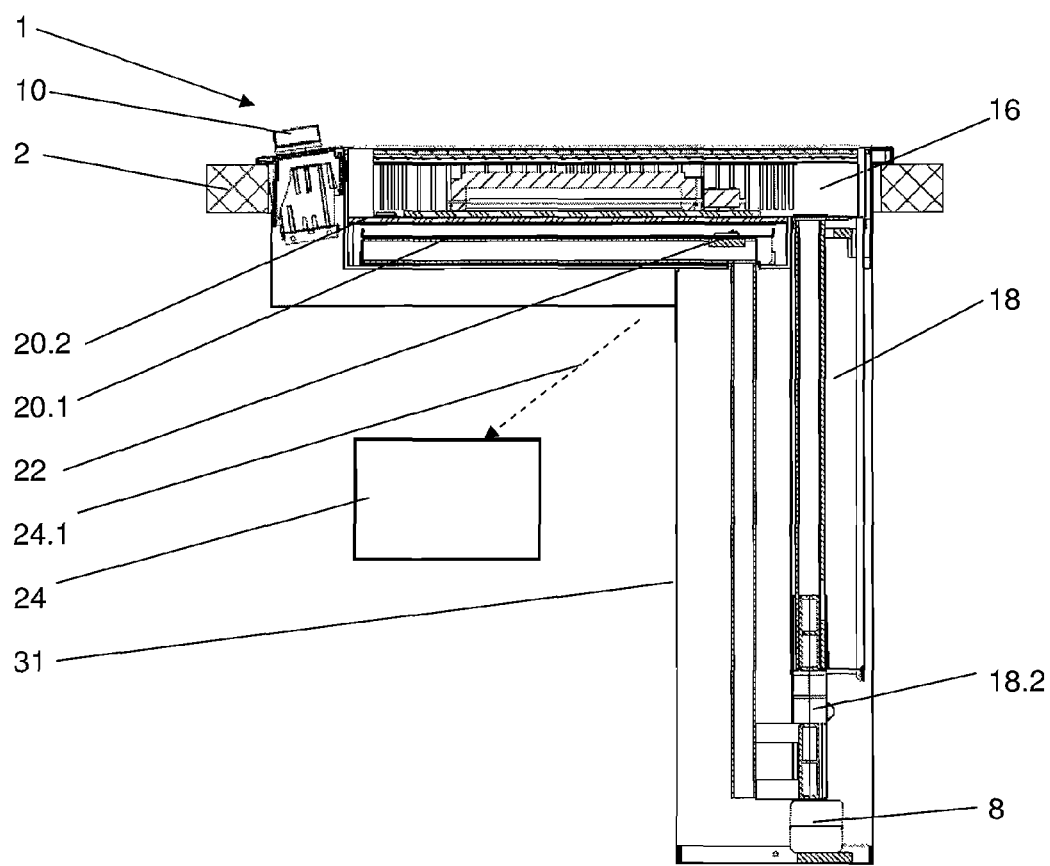
FIGS. 4 to 7 show sectional side views of the cooking device of FIG. 1, showing different height positions of the support mechanism.

FIG. 4 shows the support mechanism 18 in its inactive position; the top of the cooking device 1 is almost flush with the top of the work surface 2. As can be clearly seen in FIG. 4, the tray 20 with the cover plate 20.2 and the bottom of the heating unit 16 are essentially in contact with each other in the depicted inactive position of the support mechanism 18. The drive 8 drives a threaded rod 26 that is shown in greater detail in FIGS. 8 to 13. The support mechanism 18 is joined via a sleeve 18.1 to the threaded rod 26 so as to transmit force, so that the rotational movement of the threaded rod 26 is converted into a translatory movement of the support mechanism 18. In order to prevent the support mechanism 18 from tilting during movement, the support mechanism 18 is guided by two additional sleeves 18.2 located on two guide tubes 28. All of the actuating elements to move the support mechanism 18 are arranged in a housing 31 of the cooking device 1, so that it is also possible to simply arrange the cooking device 1 according to the present embodiment on a work surface 2. In other embodiments without a housing 31, it would only be possible to install the device into another enclosure, for instance, a kitchen cabinet underneath the counter. The broken-line arrow 24.1 in FIG. 4 symbolizes the signal-transmission connection between the solenoid switch 22 and the electric control unit 24.

Figure 5:
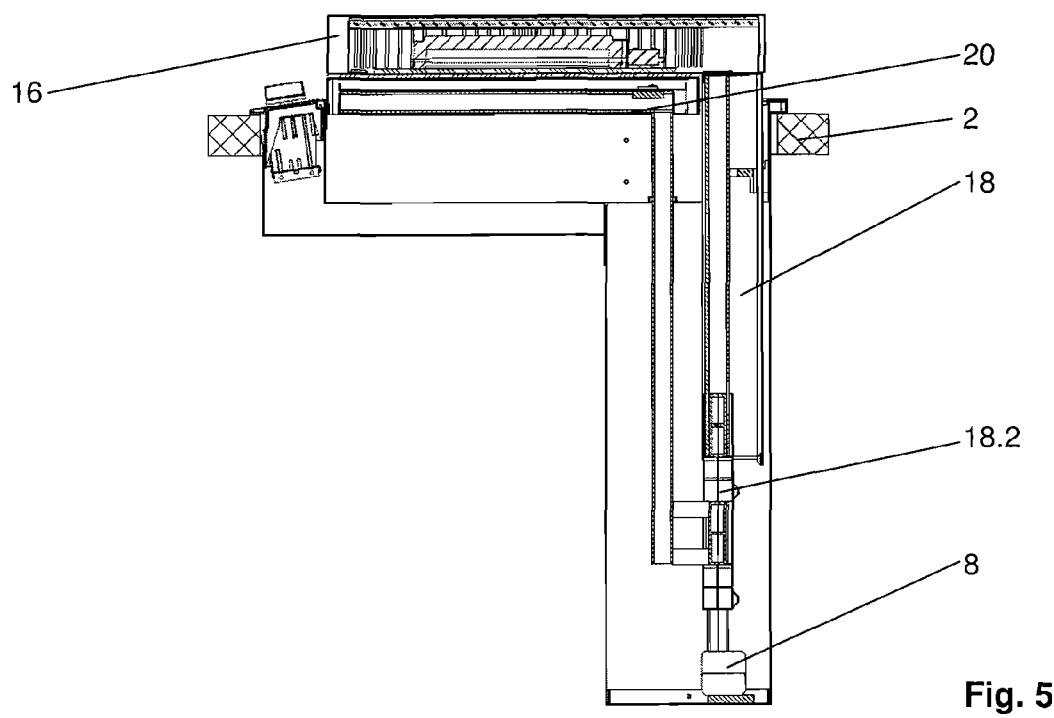
Figure 6:
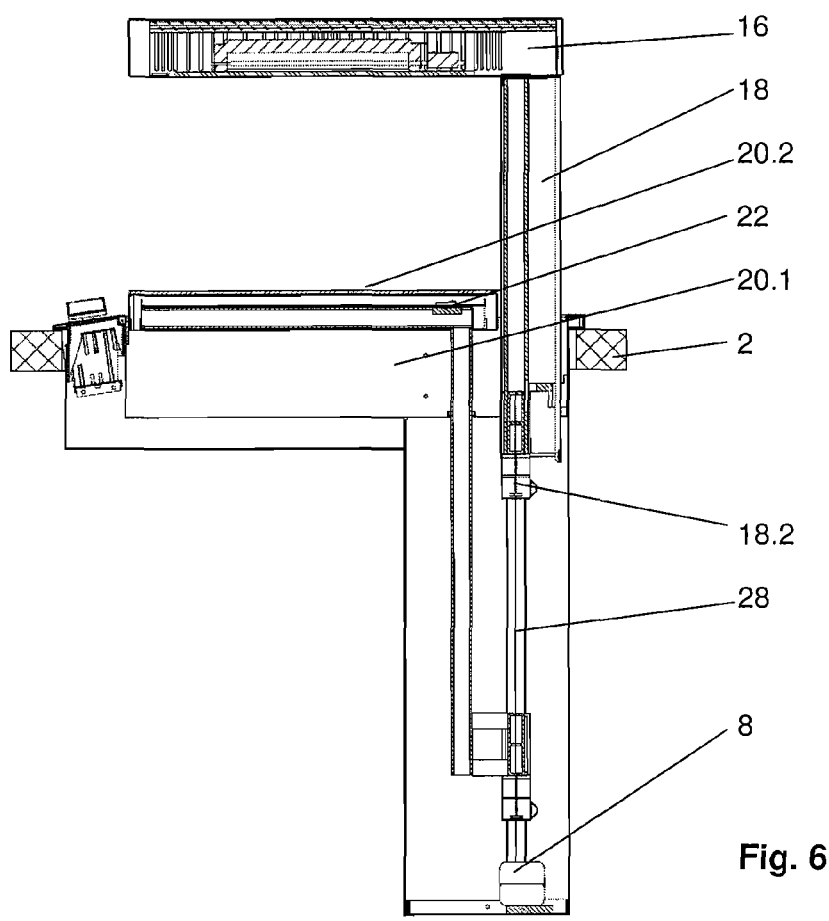
Figure 7:
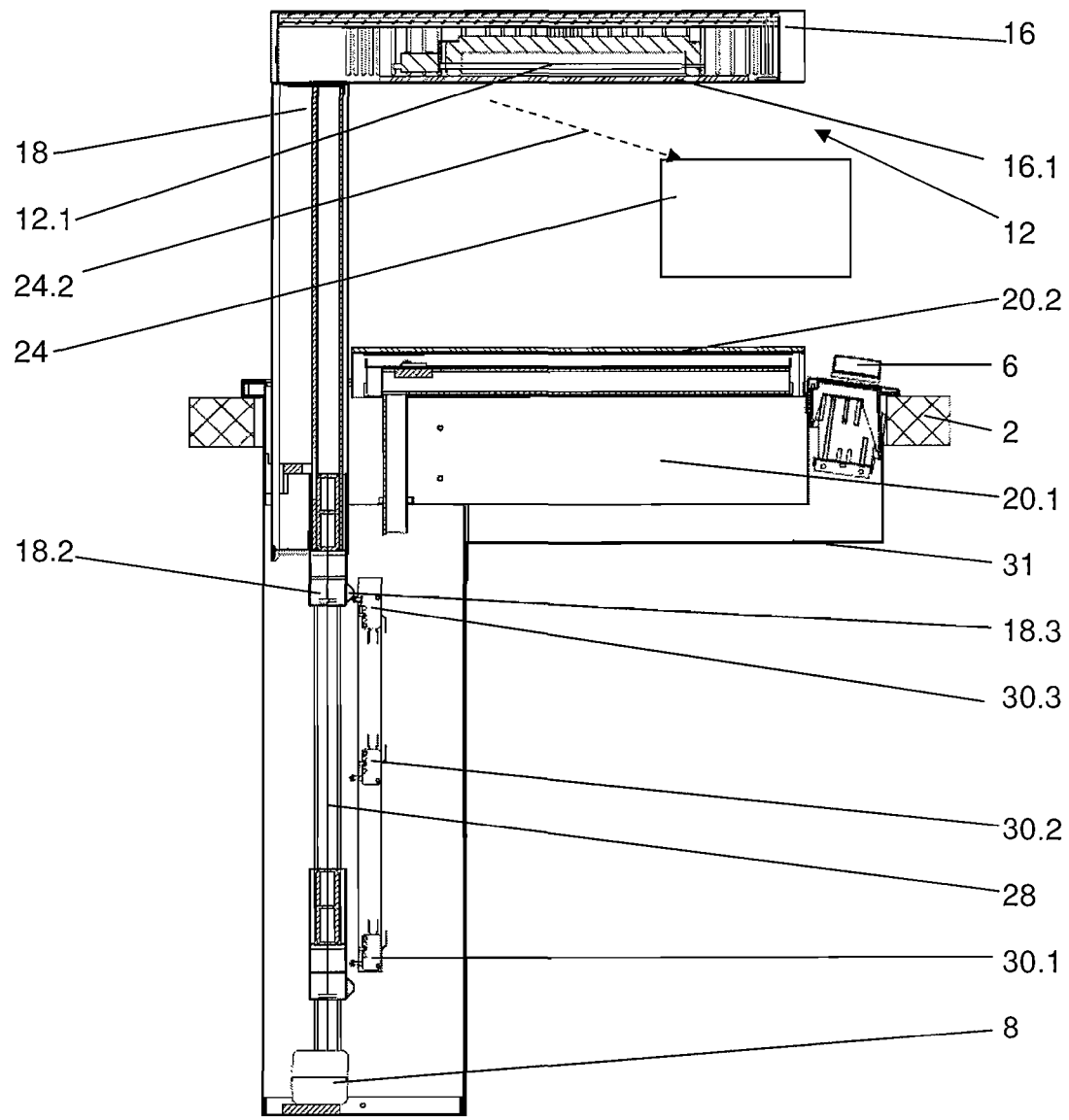

In contrast to FIG. 4, FIGS. 5 to 7 show the cooking device 1 in an intermediate position, see FIG. 5, and in a possible operating position, see FIGS. 6 and 7. A combined observation of FIGS. 4 to 7 clearly shows that the tray 20 and the heating unit 16 in the inactive position and even in the intermediate position, are still positioned close to each other, whereas FIGS. 6 and 7 already show that, while the support mechanism 18 is being moved into an operating position, the heating unit 16 moves further towards the top relative to the plane of the drawing, while the tray 20 remains in the position shown in FIG. 5.

FIG. 7 shows the cooking device 1 in a sectional view, in the viewing direction of the other side of the cooking device 1 in comparison to FIG. 6. The position sensors 30.1, 30.2 and 30.3, which are configured as microswitches, are likewise visible in this view. The microswitches 30.1 to 30.3 are actuated by an actuation tab 18.3 arranged on the support mechanism 18. As a result, a sensor system to ascertain the position of the support mechanism 18, namely, the height position of the support mechanism 18, can have a simple and sturdy construction.

While the support mechanism 18 is being moved from the inactive position into one of the possible operating positions that can be freely selected by the user by means of the operating knob 6, as shown in a time-lapse fashion in the sequence of FIGS. 4 to 7, the actuation of the position sensor 30.3—in other words, of the uppermost microswitch on the plane of the drawing—by means of the actuation tab 18.3 causes the drive 8 that had been switched on by the operating knob 6 to be automatically switched off again; the maximum possible height position of the support mechanism 18 has been reached.

Due to the counterclockwise actuation of the operation knob 6 as explained in greater detail above, the drive 8 is automatically switched on again; now it turns in the opposite direction, so that the support mechanism 18 is moved from the maximum possible operating position back towards the inactive position.

The same applies analogously to the other possible operating positions of the support mechanism 18. As soon as the actuation tab 18.3 actuates the position sensor 30.2, that is to say, the middle microswitch, during the movement into the inactive position, the signal of a temperature sensor 12.1 that detects the temperature of the heater 12 and thus of the heating device 16 is automatically evaluated by the electric control unit 24. In this context, also see the broken-line arrow 24.2 in FIG. 7, which symbolizes the signal-transmission connection between the temperature sensor 12.1 and the electric control unit 24. If the measured temperature exceeds a pre-specified switching temperature of about 65° C. in the case here, the drive 8 is automatically switched off; the same applies for the eventuality that the temperature is the same as the switching temperature. If the temperature is below the switching temperature of about 65° C., the support mechanism 18 can be moved further towards the inactive position in the manner already described above, until the inactive position shown in FIG. 4 is ultimately reached. In the inactive position, the actuation tab 18.3 actuates the lowermost microswitch, that is to say, the position sensor 30.1, by means of which the drive 8 is switched off again.

The drive is automatically switched off if the temperature measured by the temperature sensor 12.1 is the same as or higher than 65° C. at the point in time when the position sensor 30.2 is actuated. Therefore, at higher temperatures, the support mechanism 18 cannot be moved further towards the inactive position; the top of the cover plate 20.2 and the bottom of the heating device 16 are at a distance of about 65 mm from each other here. The drive 8 can only be switched on again by means of the operating knob 6 once the temperature of the heater 12 has fallen below 65° C. The further course is as described above.

A residual heat display 32 configured as an indicator lamp situated on the operating panel 4 shows the user whether the temperature has fallen below 65° C. As soon as the temperature measured by the temperature sensor 12.1 is lower than 65° C., the light in the residual heat display 32 goes off. In contrast, at higher temperatures, the residual heat display 32 lights up.

In order to further improve the protection against an undesired lowering of the support mechanism 18, an additional temperature sensor in the form of a temperature limiter 12.2 is provided here. The use of the temperature limiter 12.2 here offers additional protection against cable breakage since the current path of the temperature limiter 12.2 is closed in the normal state and when the temperature of the heating unit 16 is lower than 65° C. If a cable is broken, the current path is opened and the temperature limiter 12.2 acts redundantly to the temperature sensor 12.1 already comprehensively explained above. For the rest, the temperature limiter 12.2 functions analogously to the temperature sensor 12.1.

Moreover, in the present embodiment, the electric control unit 24 evaluates the rise in current of the drive 8 for purposes of automatically controlling the drive 8 and thus moving the support mechanism 18. For instance, if a heavy object has been placed onto the top of the heating unit 16 when the support mechanism 18 is in the inactive position, see FIG. 4, and if the user would like to move the support mechanism 18 to an operating position in the manner explained above, this is automatically detected by the electric control unit 24 in a manner familiar to the person skilled in the art due to a rise in the current being supplied to the motor of the drive 8 and the drive is automatically switched off. In the opposite case, in other words, if the user would like to move the support mechanism 18 from an operating position, see FIG. 6 or 7, into the inactive position shown in FIG. 4, and if due to inattentiveness, a finger or hand has been placed into the space between the tray 20 and the heating device 16, the electric control unit 24 automatically switches off the drive 8 in an analogous manner. In the latter case, that is to say, if the drive 8 is switched off while the support mechanism 18 is being moved into the inactive position, the drive 8 is controlled by the electric unit 24 in a manner known to the person skilled in the art in such a way that the support mechanism 18 moves again a small distance in the opposite direction, in other words, towards the operating position. This is done here in that the drive 8 is switched off after the undesired rise in current has been automatically detected and is switched back on in the reverse direction of rotation for a pre-specified duration.

In both cases, the detection of a rise in current that exceeds a pre-specified maximum value causes the drive 8 to immediately be switched off, so that the support mechanism 18 is not moved any further. As a result, in a manner involving simple circuit-engineering means, it is possible to achieve overload protection as well as an auto-reverse feature, thus enhancing the protection against damage to persons and property.

The sequences of the movement of the support mechanism 18 for the present embodiment can be seen in FIGS. 8 to 13, which will be elaborated upon below.

Figure 8:
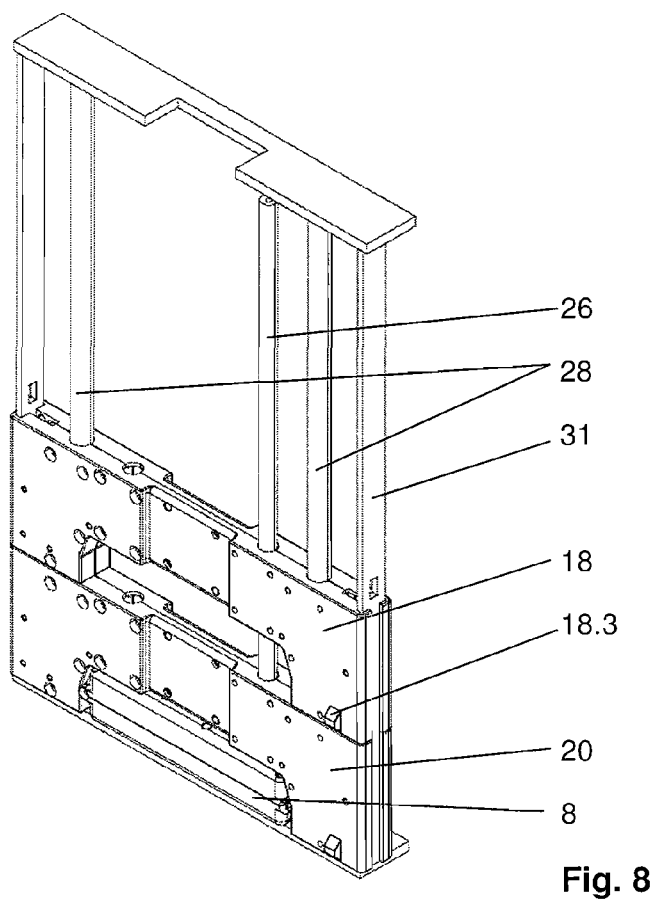
FIGS. 8 to 13 show a partial depiction of the cooking device of FIG. 1, in the area of the support mechanism, showing different height positions, alternating between perspective and sectional views.

FIG. 8 partially shows the cooking device 1 in the viewing direction of the support mechanism 18 in the inactive position, that is to say, in the position already shown in FIGS. 1 and 4. As already explained above, the heating unit 16 is attached to the support mechanism 18 in a fixed position, so that the heating device 16 is affixed on the support mechanism 18 in the vertical direction, in other words, in the image plane of FIG. 9 parallel to the lengthwise edge of the drawing. The tray 20 is coupled to the support mechanism 18 via a latch 20.3 and thus to the heating unit 16 so as to transmit force, which can be clearly seen in FIG. 9. Towards this end, the support mechanism 18 has a kind of latching mechanism 18.4 that is configured here as a cylindrical pin and that engages with the latch 20.3 in the coupled state. The latch 20.3 is pre-tensioned in the position shown in FIG. 9 by means of a spring element 34 configured as a spiral spring in such a way as to promote a clockwise rotational movement of the latch 20.3 around the axis of rotation 36. Therefore, the latch 20.3 and the latching mechanism 18.4 form a coupling by means of which the heating device 16 and the tray 20 are detachably connected as a function of the height position of the support mechanism 18.

Figure 9:
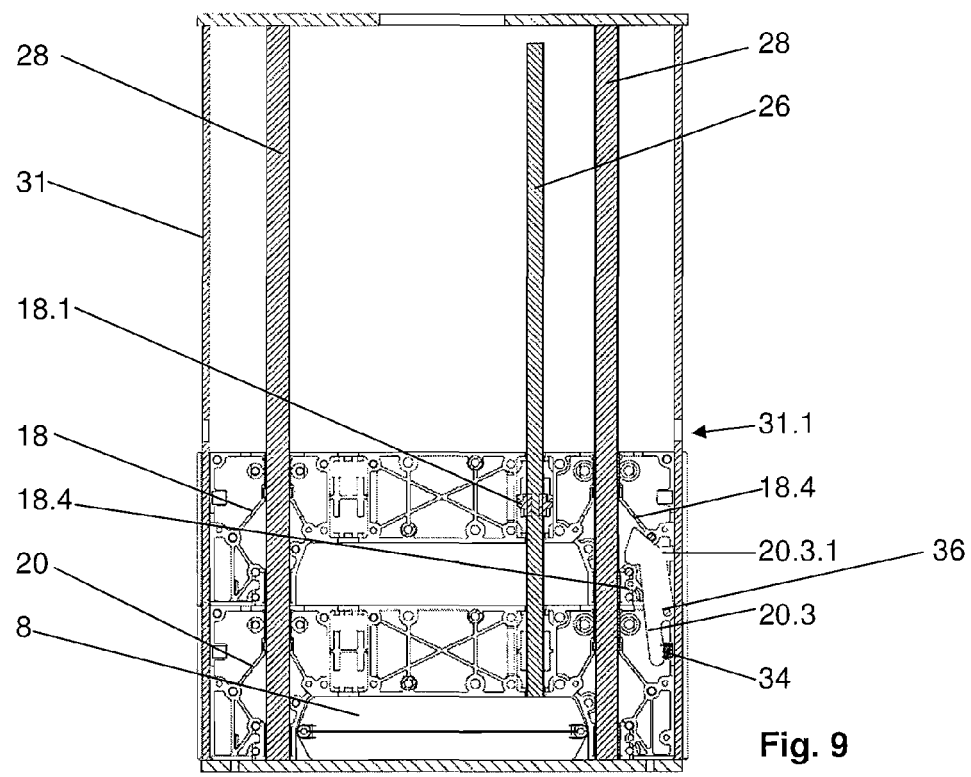
Figure 10:
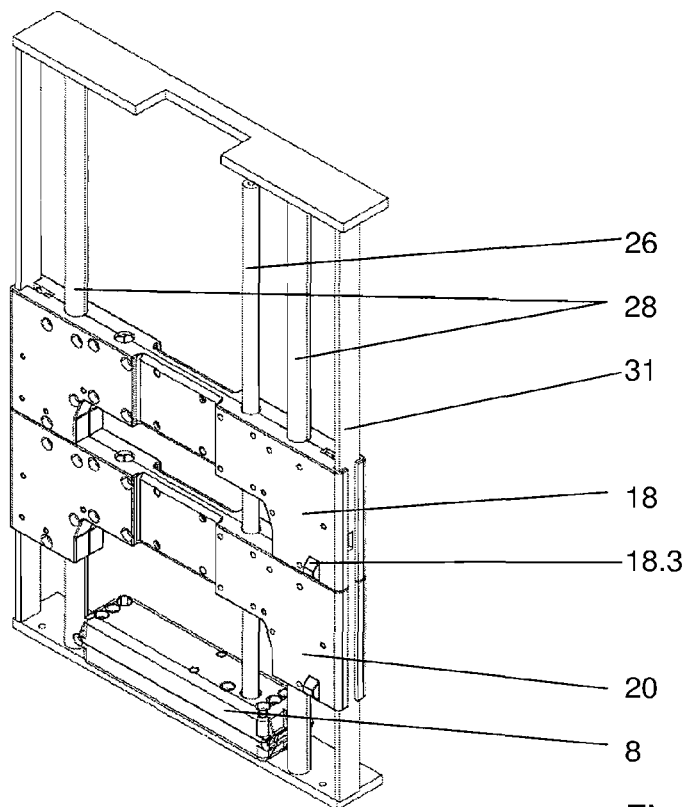
Figure 11:
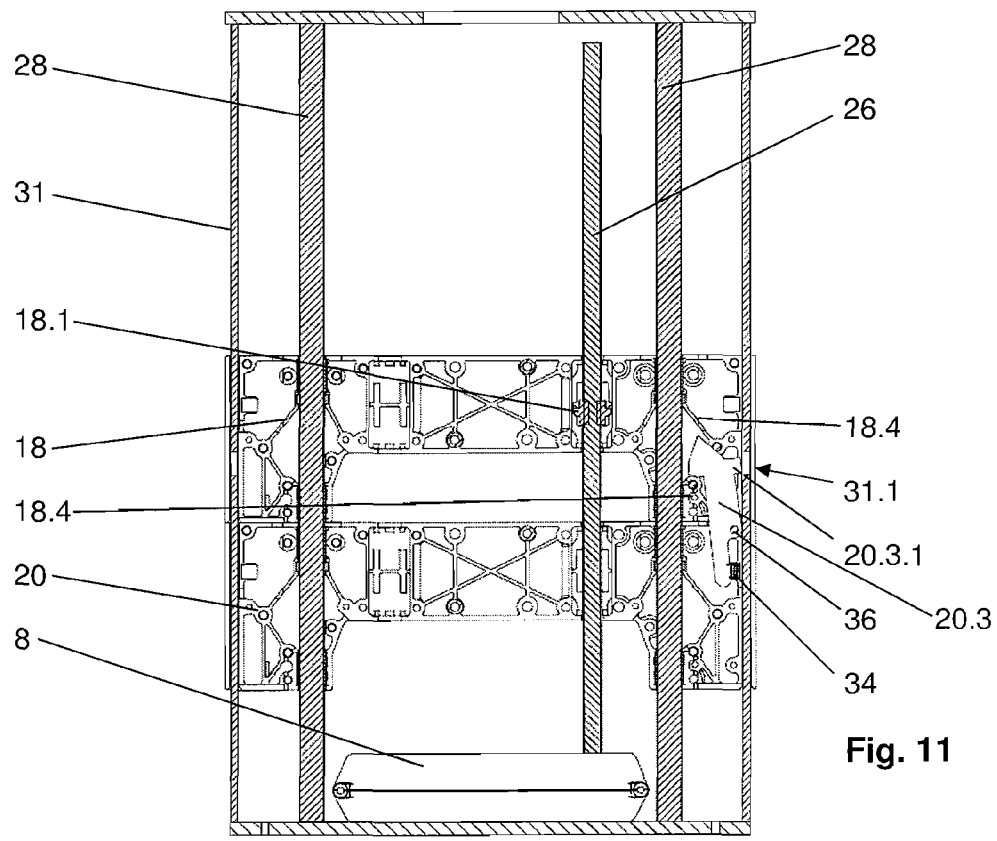
Figure 12:
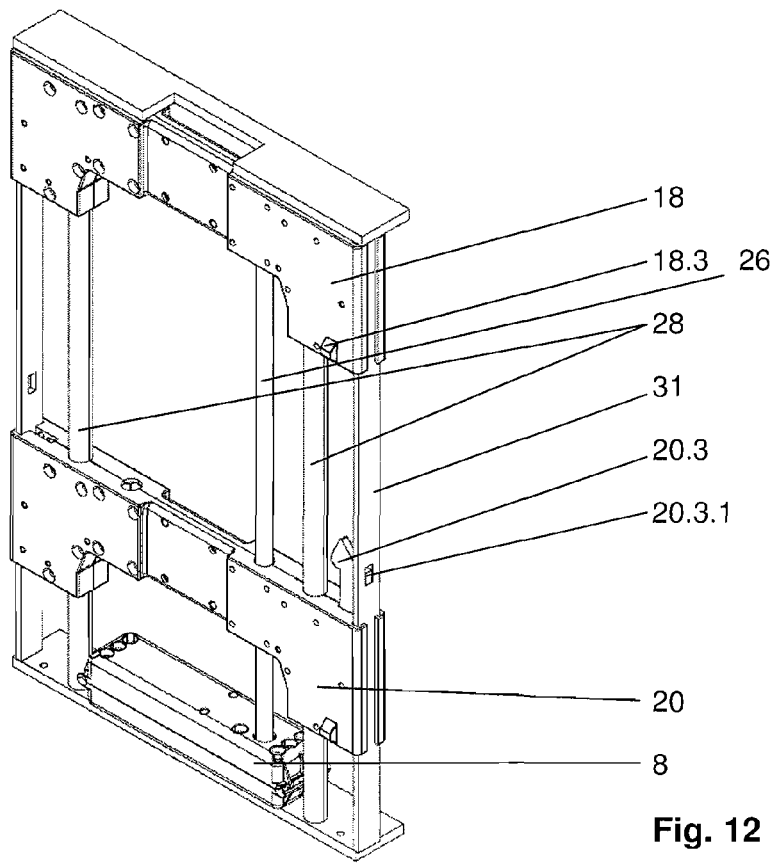
Figure 13:
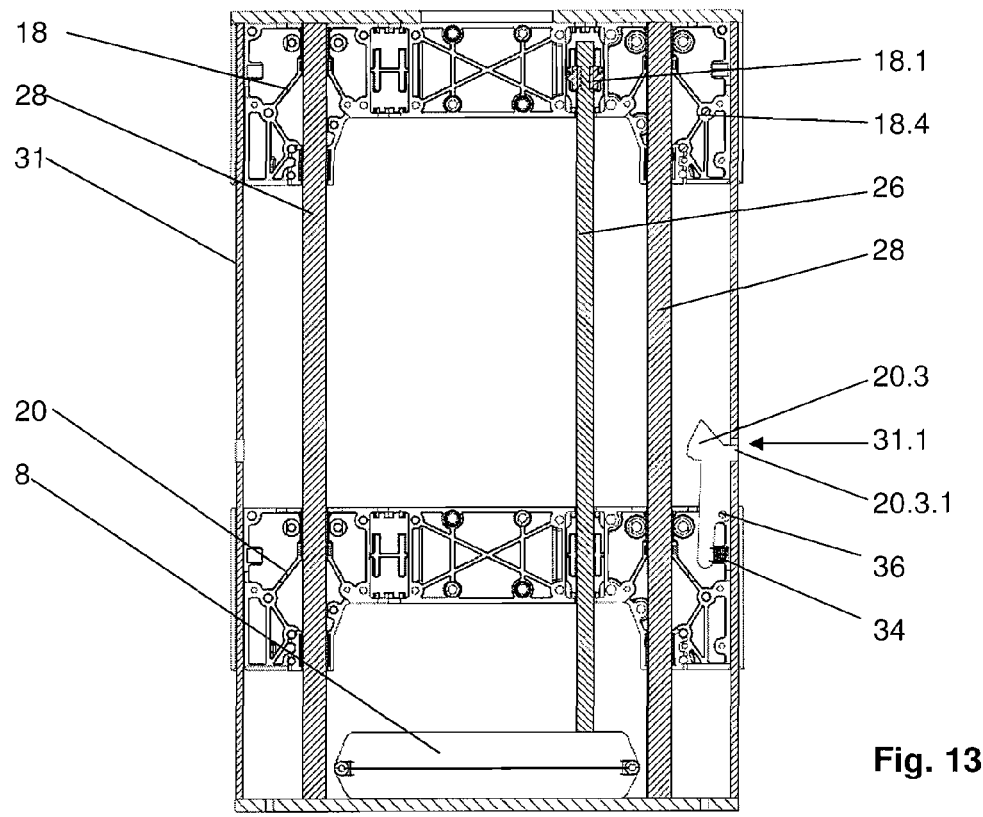

FIGS. 10 and 11 show the cooking device 1 in a partial view in the viewing direction of the support mechanism 18 in an analogous view to FIGS. 8 and 9 in the intermediate position between the inactive position and the operating position already shown in FIG. 5.

In this position of the support mechanism 18, the latch 20.3 with a nose 20.3.1 arranged on it is at the height of an opening 31.1 formed in the housing 31 corresponding to the nose 20.3.1. The latch 20.3 that is pre-tensioned by the spiral spring 34 moves clockwise around the axis of rotation 36, so that the latch 20.3 with the nose 20.3.1 engages into the opening 31.1. This rotational movement transpires concurrently with the further upward movement—relative to the image plane of FIG. 11—of the support mechanism 18, so that, in the meantime, the latch 20.3 is disengaged from the latching mechanism 18.4.

The coupling formed by the latch 20.3 and the latching mechanism 18.4 is released; since the latch 20.3 is now latched to the housing 31, the tray 20 remains fixed in its height position; also see FIG. 5. The heating device 16 is moved further upwards by the support mechanism 18 in the manner described above. Also see FIGS. 6 and 7 in conjunction with FIGS. 12 and 13.

This upward movement of the heating device 16 is stopped, as already described above, either by the user by actuating the operating knob 6 or by actuating the position sensor 30.3 by means of the actuation tab 18.3.

When the support mechanism 18 is moved from one of the possible operating positions to the inactive position, the sequence explained above is executed in the opposite order. The heating device 16 attached to the support mechanism 18 moves downwards in the image plane of FIG. 13. As soon as the support mechanism 18 has reached the height position according to FIG. 11, the latch 20.3 engages with the latching mechanism 18.4. As the support mechanism 18 continues its downward movement, the latching mechanism 18.4 pulls the latch 20.3 against the spring force of the spiral spring 34 with the nose 20.3.1 out of the opening 31.1 of the housing 31. In this process, the latch 20.3 is turned counterclockwise around the axis of rotation 36. The coupling of the tray 20 and the heating 16 formed by the latch 20.3 and the latching mechanism 18.4 is restored. Starting from this height position of the support mechanism 18, both the heating device 16 and the tray 20 are moved jointly further downwards.

As already explained, this downward movement is likewise stopped, either when the user actuates the operating knob 6 or when the position sensor 30.1 is actuated by means of the actuation tab 18.3.

The invention is not limited to the present embodiment. For instance, other suitable couplings known to the person skilled in the art are likewise conceivable for purposes of coupling the tray to the heating unit as a function of the height position of the support mechanism. As an alternative to the proposed coupling, it is also conceivable for the support mechanism to be configured in two parts, whereby one part holds the tray and the other part holds the heating device, and the height of both parts of the support mechanism can be adjusted by separate drives, in other words, they can be moved in the vertical direction. The type and arrangement of the employed position and temperature sensors can also be freely selected over a wide range. The same applies to the spring element, whose type, spring constant and arrangement can be freely selected over a wide range. Fundamentally, instead of the electric drive employed here, other automatic or even manual drives known to the person skilled in the art are likewise conceivable.

The invention claimed is:

1. A cooking device disposable on a horizontal surface, the cooking device comprising:
   a support mechanism that is movable by a drive, in a direction substantially vertical to the surface, between an operating position and an inactive position;
   a heating unit disposed on the support mechanism;
   a food tray disposed on the support mechanism; and
   a coupling configured to detachably connect the food tray to the heating unit as a function of a height position of the support mechanism;
   wherein:
   the food tray and heating unit are held on the support mechanism such that the food tray and heating unit are movable relative to one another;
   at least one of the food tray and heating unit is vertically fixed with respect to the support mechanism; and
   the food tray has, in the inactive position of the support mechanism, a height position lower than a height position of the surface.

2. The cooking device as recited in claim 1, wherein the drive is automatic.

3. The cooking device as recited in claim 1, wherein the drive is manual.

4. The cooking device as recited in claim 1 wherein the coupling includes a latch on the food tray or heating unit, the latch being pre-tensioned by a spring element in a direction of an unlatching position.

5. The cooking device as recited in claim 1 wherein the food tray and the heating unit are in contact with each other when the support mechanism is in the inactive position.

6. The cooking device as recited in claim 1 wherein the food tray and the heating unit are adjacent to each other when the support mechanism is in the inactive position.

7. The cooking device as recited in claim 1 further comprising:
   at least one position sensor configured to measure a height position of the support mechanism; and an electric control unit configured to switch a heater of the heating unit as a function of a position signal from the at least one position sensor.

8. The cooking device as recited in claim 1 wherein the drive includes an electric drive, and wherein the cooking device further comprises an operating element configured to switch on the electric drive.

9. The cooking device as recited in claim 8 further comprising:
 a temperature sensor configured to detect a temperature of the heating unit; and
 an electronic control unit configured to switch the drive of the support mechanism as a function of a temperature signal from the temperature sensor.

10. The cooking device as recited in claim 1 wherein the tray includes a substructure and a removable cover plate disposable on the substructure, the cover plate being configured to interrupt a current source path of the drive when the cover plate is displaced from the substructure.

11. The cooking device as recited in claim 8 wherein the tray includes a substructure and a removable cover plate disposable on the substructure, the cover plate being configured to interrupt a current source path of the drive when the cover plate is displaced from the substructure.

12. The cooking device as recited in claim 9 wherein the tray includes a substructure and a removable cover plate disposable on the substructure, the cover plate being configured to interrupt a current source path of the drive when the cover plate is displaced from the substructure.

13. The cooking device as recited in claim 1 wherein the drive is configured to automatically switch off as a function of a rise in current.

14. The cooking device as recited in claim 8 wherein the drive is configured to automatically switch off as a function of a rise in current.

15. The cooking device as recited in claim 9 wherein the drive is configured to automatically switch off as a function of a rise in current.

16. The cooking device as recited in claim 10 wherein the drive is configured to automatically switch off as a function of a rise in current.

* * * * *